July 8, 1930.  H. M. KEITH  1,770,311
ENGINE
Filed March 22, 1929   7 Sheets-Sheet 1

July 8, 1930. H. M. KEITH 1,770,311
ENGINE
Filed March 22, 1929 7 Sheets-Sheet 5

H. M. Keith, INVENTOR
BY Victor J. Evans
ATTORNEY

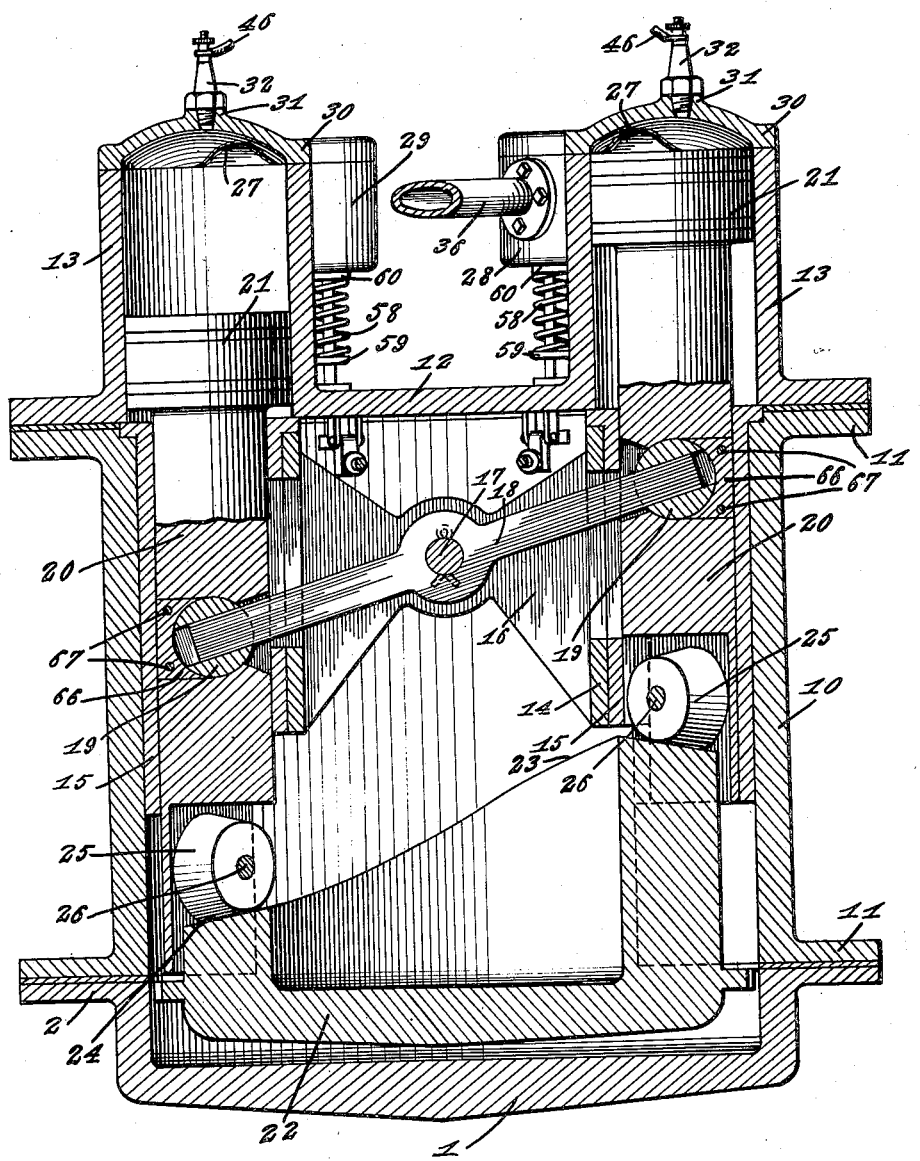

July 8, 1930.  H. M. KEITH  1,770,311
ENGINE
Filed March 22, 1929   7 Sheets-Sheet 7
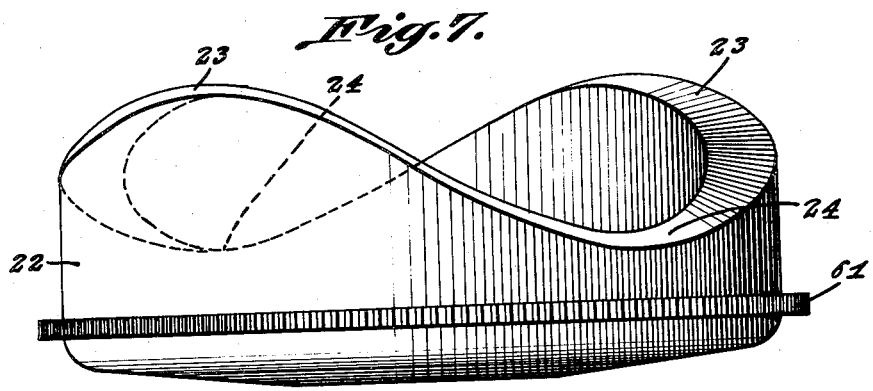
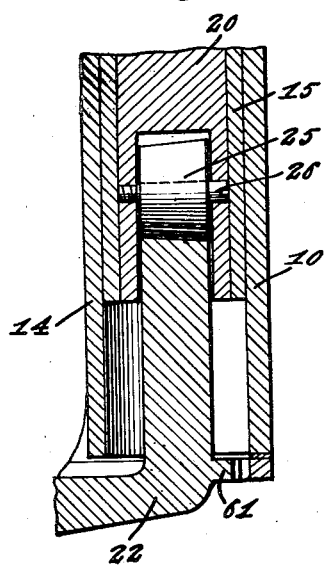
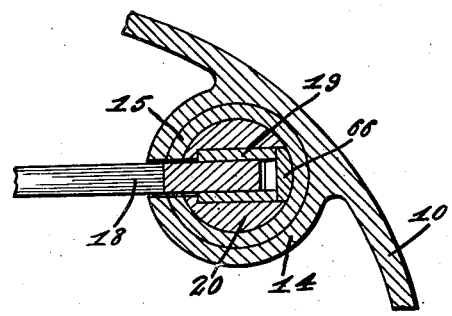

Patented July 8, 1930

1,770,311

UNITED STATES PATENT OFFICE

HENRY M. KEITH, OF HARRISBURG, ILLINOIS, ASSIGNOR TO THE KEITH MOTOR COMPANY, A CORPORATION OF ILLINOIS

ENGINE

Application filed March 22, 1929. Serial No. 349,243.

This invention relates to engines, and one of its objects is to provide an internal combustion engine that includes a rotary cam for moving pistons having guiding means, with the result the pistons do not depend upon their cylinders to guide the same in their movement, therefore wear upon the cylinder walls will be reduced to a minimum, and in any event the wear will be even about the entire surface of the walls, more especially due to absence of lateral movement of the cylinders as the moving means therefore give the same a true vertical lift, there not being any crank shaft or piston rods, nor wrist pins and main bearings, that are included in engines now in general use.

A further object of the invention is to provide an engine of the character set forth, that completes four-cycles in one revolution of its drive shaft.

Another object of the invention is to provide an internal combustion engine that includes a simplified valve system with a single cam for operating the valves thereof.

A still further object of the invention is to provide an engine with the cylinders and their pistons grouped about a drive shaft, that includes a novel intake and exhaust means for the fuel as well as a supercharger for the latter.

Another object of the invention is to provide an internal combustion engine that has its vital parts amply protected against wear and is constructed in a manner whereby the parts are easily accessible to repair or change as the case may be.

Another object of the invention is to provide an internal combustion engine of the character set forth, that is simple in construction, inexpensive to manufacture, economical in use, and is extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 6 is a sectional view taken approximately on line 6—6 of Figure 4, looking in the direction of the arrows.

Figure 7 is a view of the cam roller forming a part of the present invention.

Figure 8 is a vertical sectional view taken through one of the cylinders and illustrating the relation of the cam roller with the piston therein.

Figure 9 is a sectional view taken approximately on line 9—9 of Figure 2.

Figure 2:
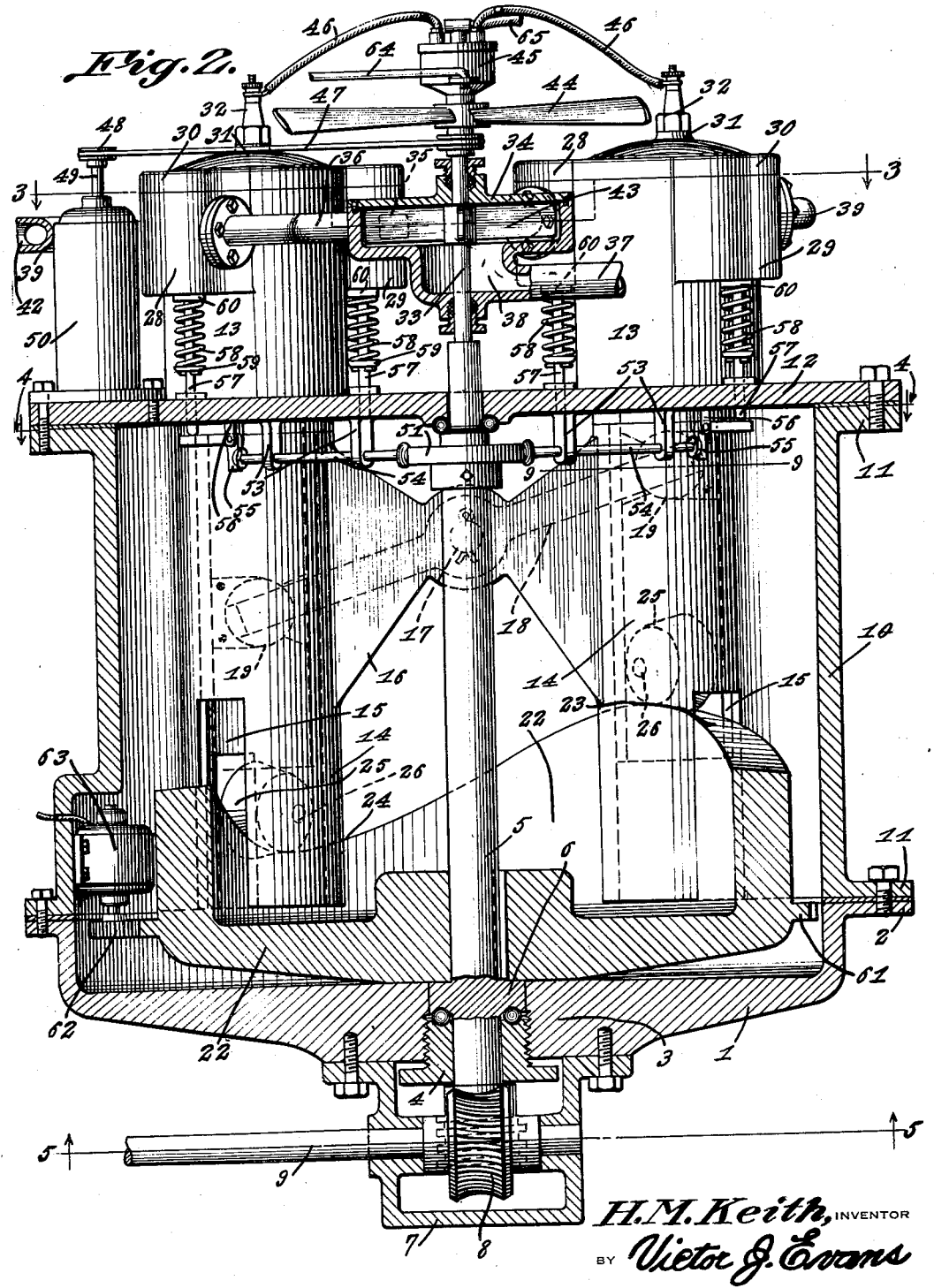
Figure 2 is a sectional view taken approximately on line 2—2 of Figure 1, looking in the direction of the arrows.
Figure 3:
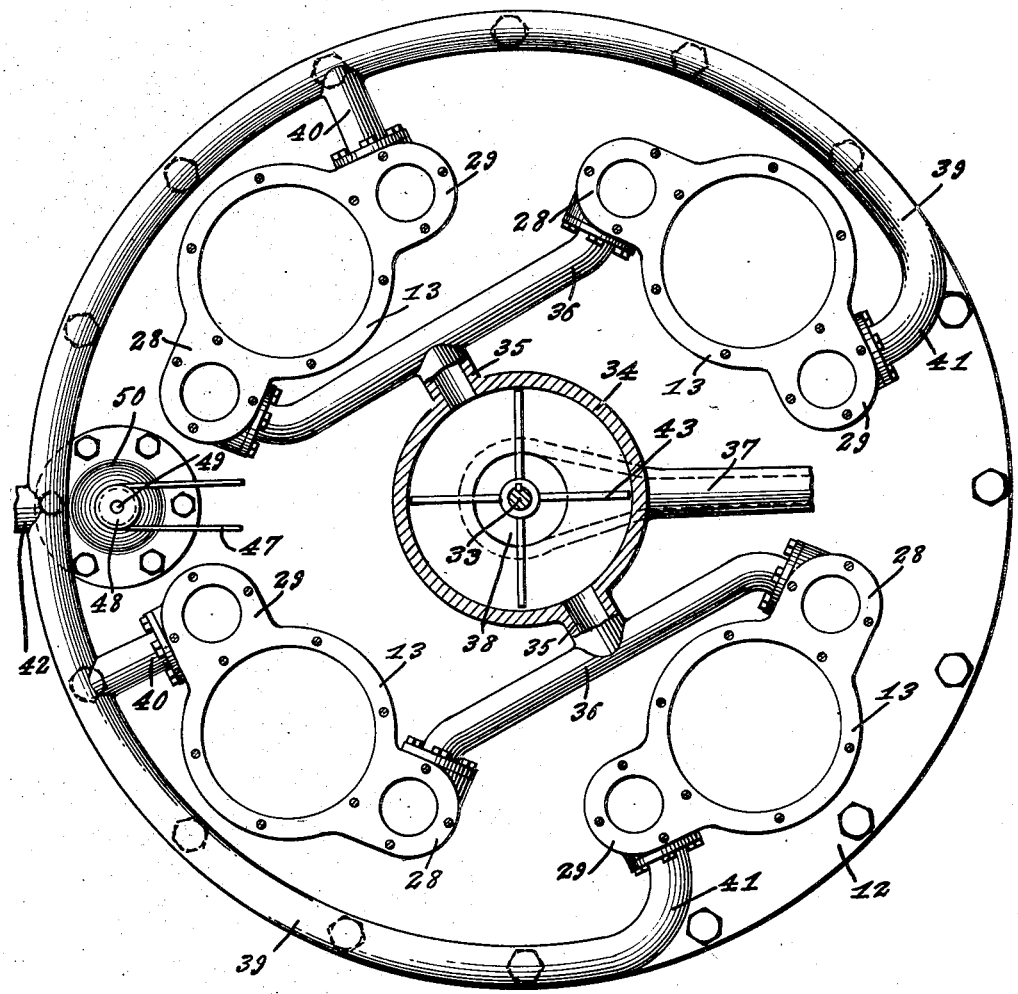
Figure 3 is a sectional view taken approximately on line 3—3 of Figure 2, looking in the direction of the arrows.

Referring to the drawings in detail, the reference numeral 1 indicates the base of the housing of my invention and this base is provided with an annular flange 2 formed with its upper edge, while its central portion is enlarged as at 3. The central portion is formed with a centrally disposed bore that is threaded for a portion of its length for the purpose of accommodating a bearing nut 4 through which passes the lower portion of the drive shaft 5. The bearing nut 4 is provided with a grooved upper surface to accommodate balls that are also received in a groove formed in the lower surface of a collar 6 on the drive shaft 5 as best shown in Figure 2. Depending from the central portion of the base 1 and secured thereto through the medium of screw bolts is a gear housing 7 which receives the lower end of the drive shaft that has formed thereon a worm meshing with a worm gear 8 that is secured to a driven shaft 9 mounted in bearings formed in the gear housing and extending therefrom as shown.

The central portion of the housing which is indicated by the reference numeral 10 has formed with its ends annular flanges 11, and the lower flange 11 cooperates with the flange 2 for receiving screw bolts for securing the flanges together as shown. The upper flange 11 supports the head for the housing and this head includes a circular plate 12 having openings arranged therethrough adjacent its periphery to receive screw bolts that pass through the upper flange 11 to secure the head to the central portion. Arranged between the flange 2 and lower flange 11 is a gasket and a like gasket is disposed between the circular plate 12 and the upper flange as shown so as to provide leak proof connections as will be apparent.

While I have shown a four-cylinder engine, I want it understood that any number of cylinders may be employed without departing from the spirit of the invention, and the cylinders 13 shown are formed with the circular plate 12 and rise therefrom as best shown in Figure 6, while formed with the central portion 10 are cylindrical casings 14 that are aligned with the cylinders 13. These cylindrical casings have arranged therein sleeves 15 that are formed with flanges at their upper ends disposed in seats for supporting the sleeves in their position, and when the head of the casing which includes the plate 12 and the cylinders 13 is removed, the sleeves can be lifted from the cylindrical casings.

Figure 4:
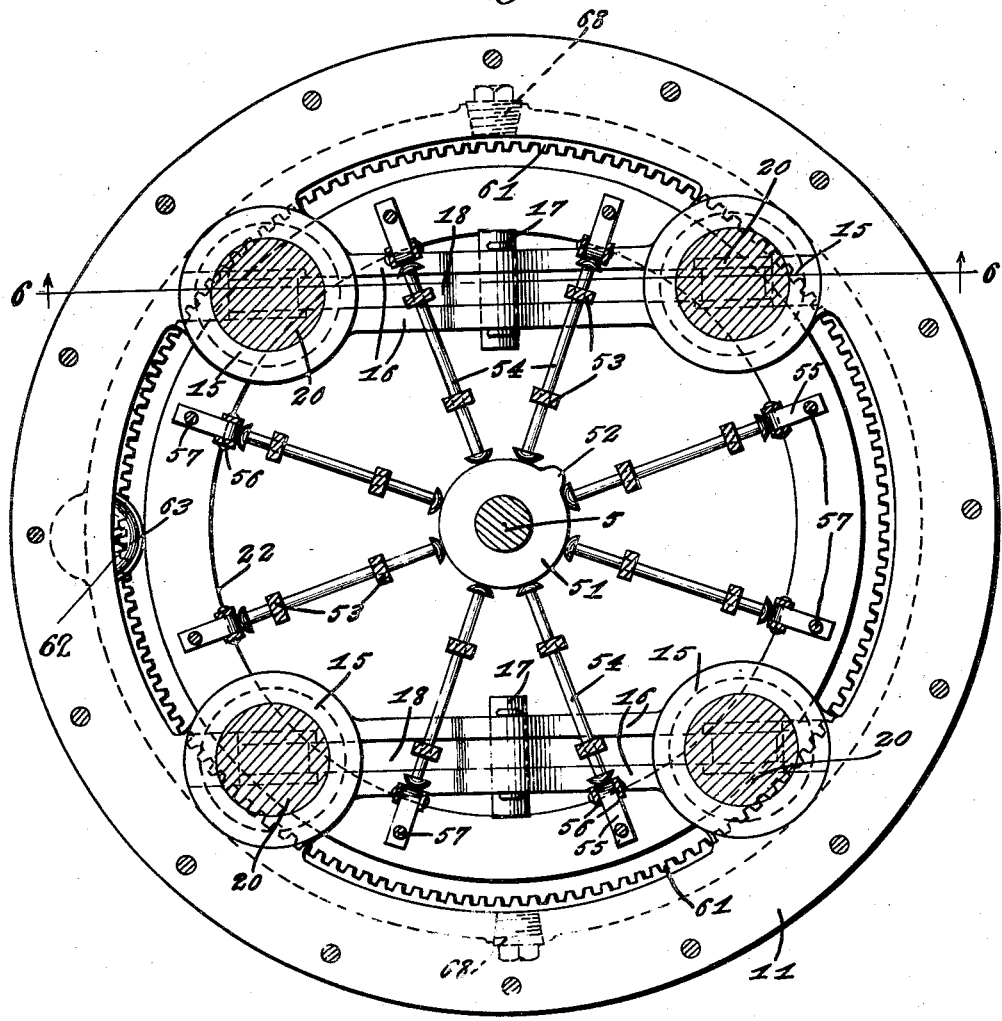
Figure 4 is a sectional view taken approximately on line 4—4 of Figure 2, looking in the direction of the arrows.
Figure 5:
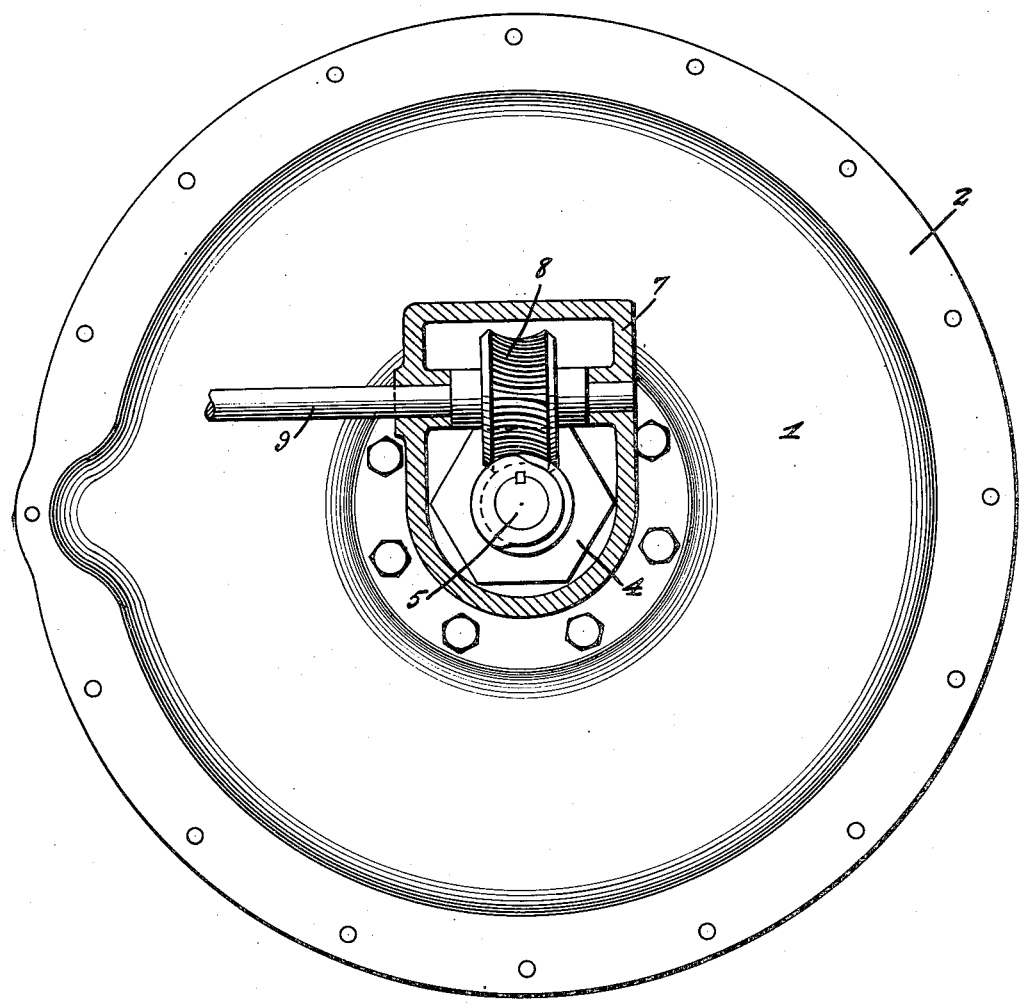
Figure 5 is a sectional view taken approximately on line 5—5 of Figure 2, looking in the direction of the arrows.

Formed integral with pairs of cylinders and bridging the same in parallel pairs are spaced flat brackets 16 that are reduced in rounded formation at their central portions and formed with openings to accommodate pins 17 of connecting rods 18. The pins 17 act as pivots for the connecting rods that are enlarged midway their ends with openings formed in the enlarged portions to accommodate the pins 17, and the outer ends of the connecting rods are received for slidable movement in bores formed in disk members 19 that are mounted for rotation in the stems 20 of the pistons 21, the former being provided with recesses to allow for the rocking movement of the connecting rods. By this construction, it will be apparent that the pistons are connected for operation in pairs as best shown in Figure 4.

Mounted for rotation on the collar 6 and keyed to the drive shaft 5 is a substantially cup-shaped cam roller 22 having a cam track formed on the upper edge thereof and this track is provided with opposed upper portions 23 and opposed lower portions 24 that merge into each other in curved formation as clearly shown in Figure 7. Mounted for movement on the track are rollers 25 that are provided with shafts 26, and a roller is provided for each piston with the shafts secured in the walls of a slot formed in the stems 20 of the pistons as best shown in Figure 8. The sleeves 15 are likewise formed with slots registering with the slots of the piston stems, and the cylindrical casings are provided with slots registering with the slots of the casings and stems so as to accommodate the vertical wall of the cup-shape cam roller 22.

The pistons 21 are mounted for reciprocation in the cylinders 13 as best shown in Figure 6 and the pistons are provided with the usual grooves to accommodate rings as shown. A baffle wall 27 is formed with the top of the pistons and laterally formed with the cylinders in opposed relation with respect to each other are intake and exhaust chambers indicated respectively by the reference numerals 28 and 29. Each of the cylinders as well as the intake and exhaust chambers are provided with caps 30 that are formed with a raised central portion 31 which is provided with an opening to accommodate the spark plug 32. The caps being formed with laterally extending portions to cover the intake and exhaust chambers as best shown in Figure 1.

Figure 1:
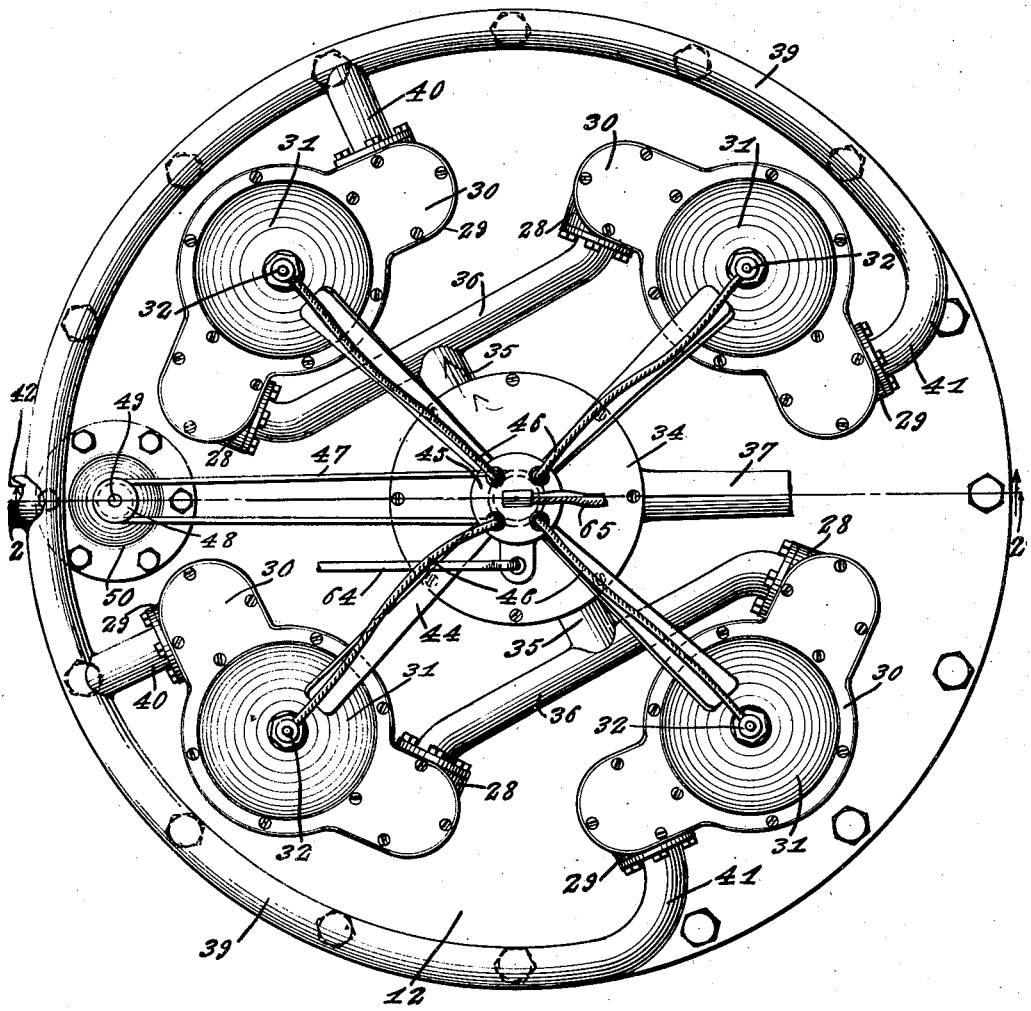
Figure 1 is a top plan view of the engine forming the subject matter of the present invention.

The drive shaft 5 is provided with a reduced upper portion that extends through the plate 12, and this reduced upper portion is further reduced as at 33, with this last mentioned reduced portion passing through a supercharger casing 34 that has extending therefrom and in opposed relation with respect to each other the intake pipes 35 of intake manifolds 36, the latter having their ends connected with adjacent intake chambers 28 as best shown in Figure 1. The supercharger casing is likewise provided with a pipe 37 that extends from the reduced lower portion 38 thereof and is in connection with a suitable carburetor, not shown.

Each of the exhaust chambers is in connection with an arcuate shape exhaust manifold 39 through the medium of branch pipes 40 and curved end portions 41. The exhaust manifold is provided with an exhaust pipe 42 extending therefrom intermediate its ends.

The supercharger casing has arranged therein a fan 43 which of course is adapted for urging the fuel to the intake chambers 28 through the intake pipes 35 and manifolds 36 and the fan 43 is secured to the upper reduced portion of the drive shaft 5 which likewise has secured thereto a fan 44 disposed above the cylinders for the purpose of acting as a cooling means for the engine, and a distributor 45 is driven by the drive shaft and is supported in any appropriate manner on the upper end thereof, with conductors 46 leading therefrom to the respective spark plugs.

A pulley is secured to the upper reduced portion of the drive shaft and this pulley receives a belt 47 and is likewise trained about a pulley 48 secured to the shaft 49 of a generator 50 that is supported on the circular plate 12 as clearly shown in Figure 2.

Figure 10:
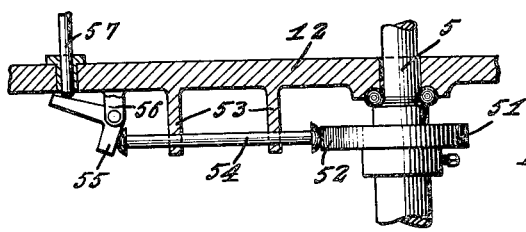
Figure 10 is a fragmentary sectional view taken through the housing head and illustrating a detail of the valve operating mechanism.

The valve system of my engine is simplified and as shown in Figure 10 includes a disk 51 that is secured to the drive shaft. Extending from the periphery of the disk 51 is a cam projection 52, and depending from the curved plate 12 in cooperating pairs are brackets 53 that slidably receive rocker rods 54 having heads formed on the ends thereof, the heads of the inner ends being disposed in the path of the cam projection 52, while the heads of the outer ends are disposed in contacting engagement with the downwardly directed arms 55 of bell crank levers that are pivotally secured between ears 56 depending from the circular plate 12, while the horizontal arms of the bell crank levers engage the bottoms of the stems 57 of valves of the usual construction.

The valves are spring pressed and for this purpose coil springs 58 surround the stems thereof and have their end convolutions engaging cups 59 secured to the stems and abutments 60 depending from the chambers 28 and 29. The heads of the valves are of course provided with seats in the chambers 28 and 29 for controlling the intake and exhaust ports in said chambers as will be apparent.

Formed with the outer surface of the cup-shaped cam roller 22 adjacent its lower edge is a ring gear 61 having teeth which mesh with a gear 62 secured to the shaft of a motor 63 for the purpose of starting the engine, and the motor is in electrical connection with a suitable source of electrical energy such as a storage battery not shown, and which is charged by the generator 50.

The distributor 45 is controlled in the usual manner through the medium of a rod 64 and has connected therewith a conductor 65 for supplying electrical energy thereto as will be apparent.

As best shown in Figure 9, the cylindrical casings 14 and the sleeves arranged therein are provided with slots for the passage of the connecting rods 18 and in order to provide for the removal of the disk members 19, it will be noted from Figure 6 that the stems 20 are formed with passages that accommodate blocks 66 which are secured therein by screw bolts or the like 67. The central portions 10 of the housing are provided upon opposite sides thereof with openings whereby the bores of the brackets 16 that accommodate the pins 17 may be formed therein, and these openings are filled by plugs 68 after the bores are provided in the brackets.

From the above description and disclosure of the drawings, it will be obvious that I have provided an engine that is extremely compact, and in the form as shown, the engine is of the four-cycle type, whereby each cylinder fires once upon each revolution of the shaft. This is made possible by the arrangement of the track formed with the cup-shaped cam roller 22. When the rollers 25 are descending from one of the upper portions, the pistons having the descending rollers connecting thereto are on their suction or intake stroke, and the other raised portion causes the pistons to rise on their compression stroke. When the pistons are descending from the last mentioned raised portion, they are on their firing stroke, and when the rollers engage the first mentioned upper portion, the pistons are on their exhaust stroke thus completing the four-cycles in one revolution of the drive shaft 5.

The engine is started through the medium of the starting motor 63 which rotates the cup-shape cam roller. This rotating action causes the pistons to reciprocate as well as causes the drive shaft 5 to rotate, thus the ignition system is put into operation which will result in the engine starting. The action of the rollers 25 upon the track will cause the cup-shape cam roller to rotate and thence drive the shaft 5 whereby the shaft 9 will be driven therefrom as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An internal combustion engine comprising a housing, a head for said housing, cylinders formed with said head and rising therefrom, intake and exhaust chambers formed with said cylinders, caps for said cylinders and chambers, pistons mounted for reciprocation in said cylinders, stems formed with said pistons, means formed with said housing to receive said stems, sleeves in said means and surrounding said stems, a drive shaft centrally arranged through said housing, rollers carried by said stems and means keyed to said drive shaft for engagement with said rollers to reciprocate said pistons.

2. An internal combustion engine comprising a housing, a vertically disposed drive shaft extending through said housing, a cam roller keyed to said drive shaft and disposed in said housing, means having connection with the curved roller for starting the engine, a head for said housing, cylinders formed with said head, pistons mounted for reciprocation in said cylinders, stems formed with said pistons, rollers carried by said stems and engageable with the cam roller to reciprocate said pistons, sleeves surrounding the stems, cylindrical casings formed with the housing and receiving said sleeves, bridging brackets disposed between pairs of said cylindrical casings and formed therewith and connecting rods pivotally secured in said bridging brackets and connected with pairs of said pistons.

3. An internal combustion engine comprising a housing, a drive shaft vertically disposed for rotation through said housing, a cam roller keyed to said drive shaft and provided with a cam track formed on its upper surface, cylindrical casings formed in said housing and being slotted to accommodate the track, sleeves arranged in said cylindrical casings and having slots registering with the slots thereof, a head for said housing, cylinders formed with said head, pistons mounted for reciprocation in said cylinders, stems formed with said pistons and having slots therein registering with the slots of the sleeves and the cylindrical casings, rollers carried by the stems and engageable with the cam roller, disk members mounted for rotation in the stems, and connecting rods pivoted midway their ends and slidably mounted in said disk members for connecting the pistons for reciprocation in pairs.

4. An internal combustion engine comprising a housing, a vertically disposed drive shaft arranged through said housing, a substantially cup-shape cam roller keyed to said drive shaft and having a cam track on its upper surface, a head for said housing, cylinders formed with said head, pistons mounted in said cylinders, stems formed with said pistons and having recesses therein, disk members mounted in the recesses for rotation, cylindrical casings formed with said housing, sleeves in said casings and being provided with slots registering with slots formed in the casings, bridging brackets between pairs of said casings, connecting rods pivotally secured midway their ends to the bridging brackets and having their ends received in the disk members, means for securing the disk members in the stems, and rollers carried by the stems and being engageable with the track to reciprocate said pistons.

5. In an internal combustion engine, a housing, a centrally disposed drive shaft vertically arranged through said housing, a head for said housing, a cooling fan secured to said drive shaft and overlying said head, cylinders rising from said head, pistons mounted in said cylinders, means driven by said drive shaft to reciprocate said pistons, a supercharger including a casing on said drive shaft, a fan secured to said drive shaft and mounted in said casing, intake and exhaust chambers formed with said cylinders, intake manifolds between the intake chambers and the supercharger casing, and an exhaust manifold in communication with each of the exhaust chambers.

6. In an internal combustion engine, a cylindrical housing, a head for said housing, cylinders formed with said head and rising therefrom, exhaust and intake chambers formed with said cylinders and being disposed in opposed relation with respect to each other, exhaust and intake manifolds for said chambers, valves arranged in said chambers, a drive shaft centrally disposed through said housing and head, means operated by said drive shaft for operating said valves, and a supercharger operated by said drive shaft and being in communication with said intake manifolds.

7. In an internal combustion engine, a cylindrical housing, a vertically disposed drive shaft extending through said housing, a cup-shape cam roller keyed to said drive shaft and supported for rotation in said housing, a ring gear formed with said cup-shape cam roller, a cam track formed with the upper edge of said roller and including opposed upper portions and opposed lower portions, a head for said housing, cylinders formed with said head, pistons in said cylinders, rollers having connection with said pistons and engageable with the cam track for reciprocating the pistons, a motor, a gear secured to said motor and meshing with the teeth of the gear first mentioned.

In testimony whereof I affix my signature.

HENRY M. KEITH.